(12) United States Patent
Yaegashi

(10) Patent No.: US 11,097,666 B2
(45) Date of Patent: Aug. 24, 2021

(54) PROVIDED AN INSTRUMENT THAT IS CAPABLE OF IMPROVING SPEAKER MOUNTING WORKABILITY

(71) Applicant: NIPPON SEIKI CO., LTD., Niigata (JP)

(72) Inventor: Yui Yaegashi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 92 days.

(21) Appl. No.: 16/631,094

(22) PCT Filed: Jul. 26, 2018

(86) PCT No.: PCT/JP2018/028041
§ 371 (c)(1),
(2) Date: Jan. 14, 2020

(87) PCT Pub. No.: WO2019/022184
PCT Pub. Date: Jan. 31, 2019

(65) Prior Publication Data
US 2020/0148129 A1    May 14, 2020

(30) Foreign Application Priority Data
Jul. 28, 2017 (JP) .............................. JP2017-146016

(51) Int. Cl.
*B60R 11/02*    (2006.01)
*B60K 37/04*    (2006.01)
*H04R 1/02*     (2006.01)

(52) U.S. Cl.
CPC .......... *B60R 11/0217* (2013.01); *B60K 37/04* (2013.01); *H04R 1/025* (2013.01); *B60K 2370/1575* (2019.05); *H04R 2499/13* (2013.01)

(58) Field of Classification Search
USPC ................ 381/324, 361, 386, 387, 389, 395
See application file for complete search history.

(56) References Cited

U.S. PATENT DOCUMENTS 5,867,583 A * 2/1999 Hazelwood ............ H04R 1/025
                                                      381/395

FOREIGN PATENT DOCUMENTS

JP        S58-86698 U     6/1983
JP        2003-153362 A   5/2003
(Continued)

OTHER PUBLICATIONS

International Search Report issued in corresponding PCT/JP2018/028041, dated Oct. 9, 2018, with English translation.

*Primary Examiner* — Yosef K Laekemariam
(74) *Attorney, Agent, or Firm* — McDermott Will & Emery LLP (57) ABSTRACT

An instrument is provided with: a body; a speaker having a plurality of flanges that bulge outward from the body; a case that has a recess for housing the speaker. The recess has a side wall, an installation surface on which the speaker is installed, and a plurality of fixing parts that fix the flanges in an orthogonal direction orthogonal to the installation surface and that bulge inward from the side wall. The speaker can rotate about the rotational axis in the orthogonal direction up to a fixing position where the flanges and the fixing parts overlap each other in the orthogonal direction after the speaker has been disposed in an unfixing position where the flanges and the fixing parts do not overlap each other in the orthogonal direction.

5 Claims, 6 Drawing Sheets

(56) References Cited

FOREIGN PATENT DOCUMENTS

| JP | 2003153362 | * | 5/2003 | ............. | B60R 11/02 |
| JP | 2007-124448 | * | 5/2007 | ............. | B60R 11/02 |
| JP | 2007-124448 | A | 5/2007 | | |
| JP | 2013-105168 | A | 5/2013 | | |

* cited by examiner

PROVIDED AN INSTRUMENT THAT IS CAPABLE OF IMPROVING SPEAKER MOUNTING WORKABILITY

CROSS REFERENCE

This application is the U.S. National Phase under 35 U.S.C. § 371 of International Application No. PCT/JP2018/028041, filed on Jul. 26, 2018, which claims the benefit of Japanese Patent Application No. 2017-146016, filed on Jul. 28, 2017, the entire contents of each are hereby incorporated by reference.

TECHNICAL FIELD

The present invention relates to an instrument, and more particularly relates to mounting of a speaker.

BACKGROUND ART

A vehicular instrument, which is an example of an instrument, includes a speaker that audibly notifies various types of vehicle information. The vehicle information is, for example, warning information indicating that a seat belt is not worn or information related to an operation of a winker. The speaker notifies such information by sound effects or voice.

The speaker is fixed to a case by being screwed, for example, on a back side of the vehicular instrument. Specifically, the speaker includes, for example, flanges and a plurality of (for example, two) through holes provided in the flanges, and is fixed to the case by being screwed into screw holes that correspond to these through holes and are provided in the case.

PRIOR ART DOCUMENT

Patent Document

Patent Document 1: Japanese Unexamined Utility Model Application Publication. No. S58-86698

SUMMARY OF THE INVENTION

Problems to be Solved by the Invention

As described above, if the speaker is fixed to the case by being screwed, it is necessary to tighten a plurality of screws. In addition, since the screws are required, the number of components has increased. These factors complicate the speaker mounting operation and lower the workability.

The present invention has been made in view of such circumstances, and an object thereof is to provide an instrument capable of improving workability at the time of mounting a speaker.

Solution to Problem

In order to solve the above-described problem, an instrument according to the present invention includes a body; a speaker having a plurality of flanges that bulge outward from the body; and a case that has a recess for housing the speaker, wherein the recess includes a side wall, an installation surface on which the speaker is installed, and a plurality of fixing parts that fix the flanges in an orthogonal direction orthogonal to the installation surface and that bulge inward from the side wall, and the speaker is rotatable about a rotational axis in the orthogonal direction up to a fixing position where the flanges and the fixing parts overlap each other in the orthogonal direction after the speaker is disposed in an unfixing position where the flanges and the fixing parts do not overlap each other in the orthogonal direction.

Effect of the Invention

In the instrument according to the present invention, workability at the time of mounting the speaker can be improved.

MODE FOR CARRYING OUT THE INVENTION

An instrument according to the present invention will be described with reference to the accompanying drawings. The instrument according to the present invention is mounted on a vehicle such as an automobile or a motorcycle, a ship, or an agricultural machine. In the present embodiment, description will be made using an example in which the instrument according to the present invention is a vehicular instrument 1 mounted on an automobile.

Figure 1:
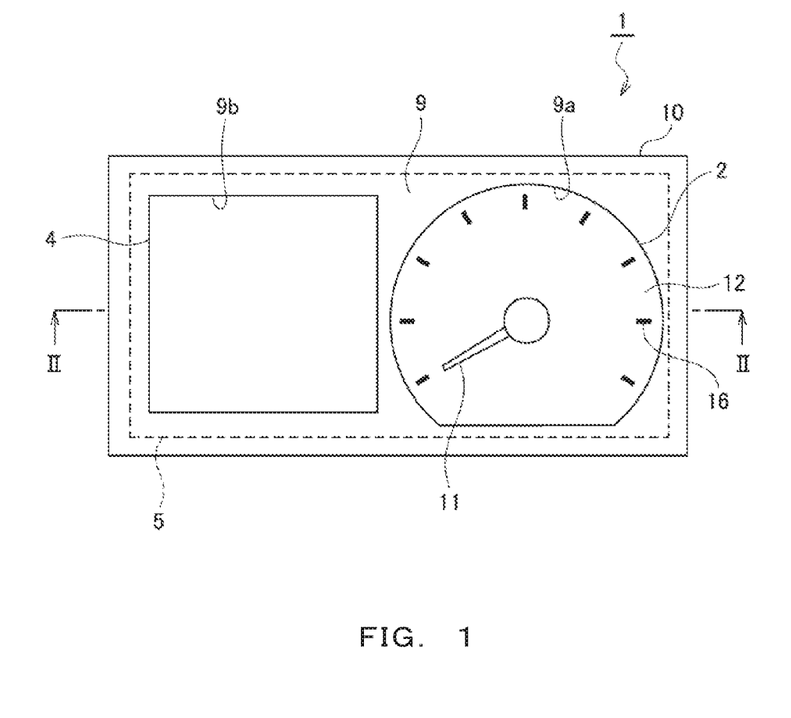
FIG. 1 is a front view of a vehicular instrument in the present embodiment.

FIG. 1 is a front view of the vehicular instrument 1 in the present embodiment.

Figure 2:
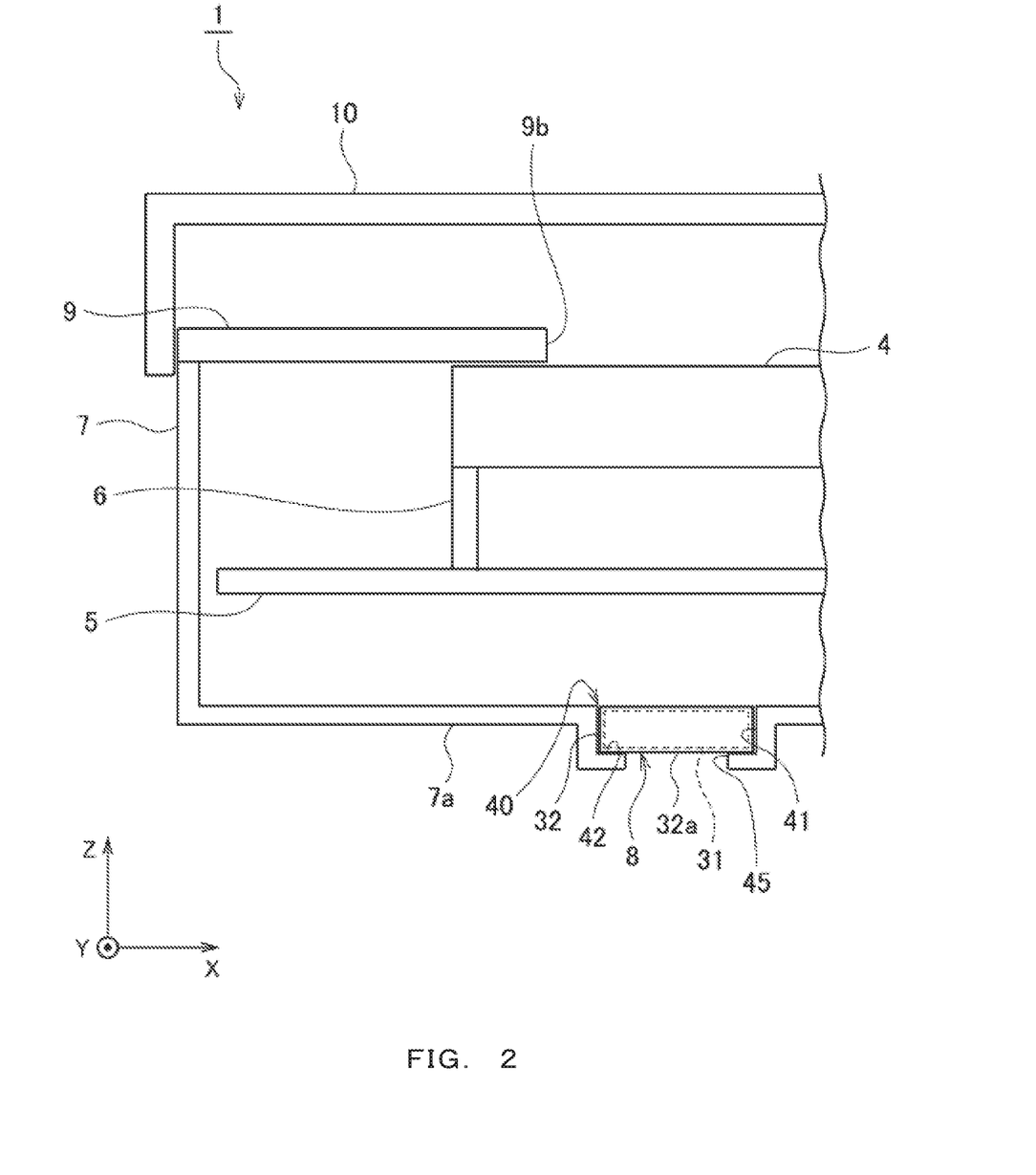
FIG. 2 is a cross-sectional view taken along line II-II in FIG. 1.

FIG. 2 is a sectional view taken along line in FIG. 1.

In the following description, a "front side" means a near side in FIG. 1, and a "back side" means a far side in FIG. 1.

The vehicular instrument 1 (instrument 1) includes a pointer-type instrument 2 and a liquid crystal display device 4.

The pointer-type instrument 2 is a speedometer, for example, and includes a pointer 11 and a dial 12. The pointer 11 rotates around a pointer shaft serving as a rotation central axis. The dial 12 is, for example, a single thin plate, and is provided on the back side of the pointer 11. The dial 12 (omitted in FIG. 2) includes an index 16 indicated by the pointer 11. The index 16 is a scale, a character, a symbol or the like.

The liquid crystal display device 4 is a liquid crystal display element in which liquid crystal molecules are sealed between a pair of glass substrates, and is a TFT (Thin Film Transistor) type liquid crystal display panel, for example. The liquid crystal display device 4 displays predetermined information such as a travel distance, a fuel consumption, and a time.

The instrument 1 further includes a circuit board 5, a middle case 6, an outer case 7, a speaker (sound generator) 8, a facing plate 9, and a transparent panel 10.

The circuit board 5 is a hard board made of, for example, a glass epoxy material. The circuit board 5 is electrically connected to each electrode terminal of the glass substrate of the liquid crystal display device 4 via a flexible printed board, and includes a control unit that controls the liquid crystal display device 4. Further, the control unit controls output of the speaker 8. The circuit board 5 includes a light source for transmissively illuminating the index 16 or transmissively illuminating a liquid crystal display element or the like.

The middle case 6 is made of, for example, white synthetic resin and is provided on the front side of the circuit board 5. The middle case 6 holds the dial 12 and the liquid crystal display device 4.

The outer case (case) 7 is made of, for example, black synthetic resin and accommodates the liquid crystal display device 4 and the circuit board 5. The outer case 7 also functions as a back cover. Further, the outer case 7 includes a recess 40 for housing the speaker 8 in a back surface 7a.

The speaker 8 audibly notifies various vehicle information. The vehicle information is, for example, warning information indicating that a seat belt is not worn or information related to an operation of a winker. The speaker 8 notifies such information by sound effects or voice.

The facing plate 9 includes an opening window 9a that defines (exposes) a display region of the pointer-type instrument 2 and an opening window 9b that defines (exposes) a display region of the liquid crystal display device 4. The transparent panel 10, which is made of a transparent or translucent synthetic resin, covers the front of the facing plate 9. The transparent panel 10 is fixed to the facing plate 9 by hooks or the like.

Next, the above-mentioned speaker 8 and recess 40 of the outer case 7 will be described in detail.

Figure 3:
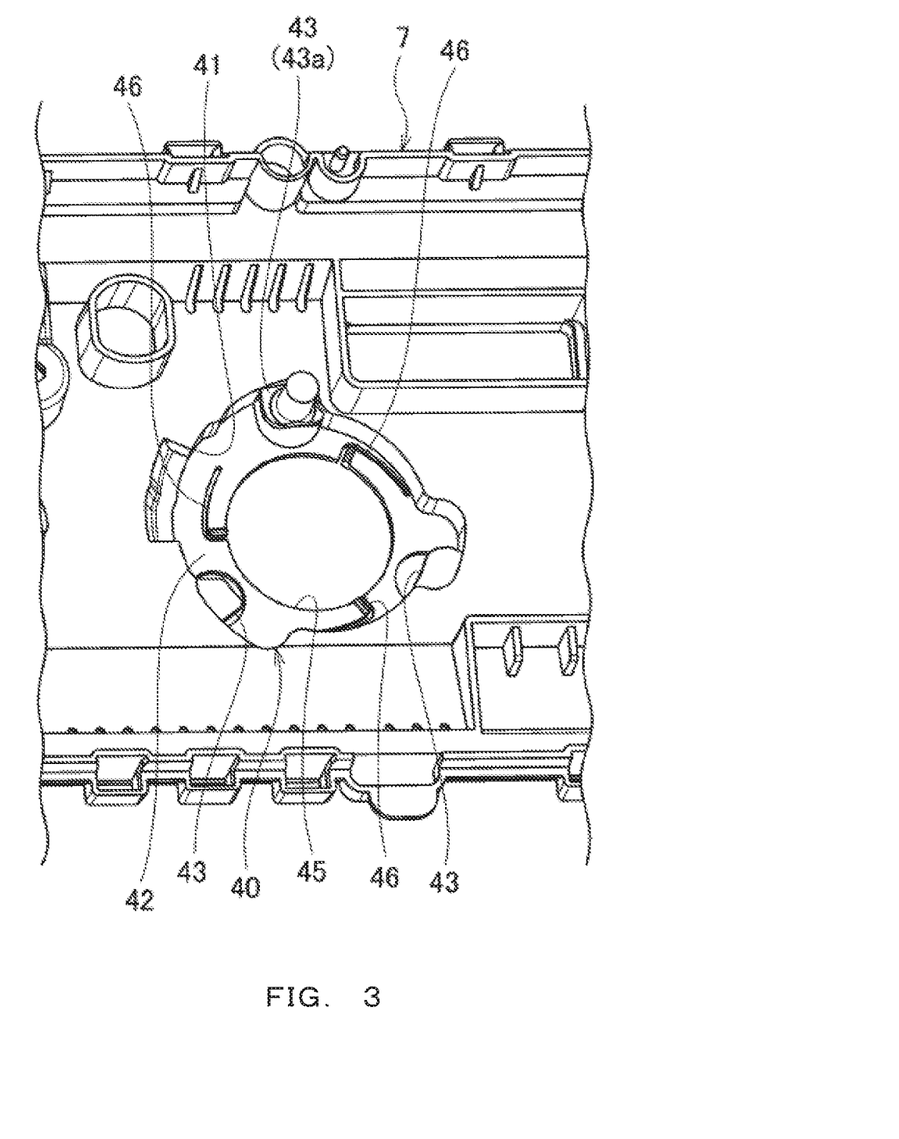
FIG. 3 is a perspective view obtained when an outer case is seen from the front surface, where a recess is particularly illustrated.

FIG. 3 is a perspective view obtained when the outer case 7 is seen from the front surface, where the recess 40 is particularly illustrated.

Figure 4:
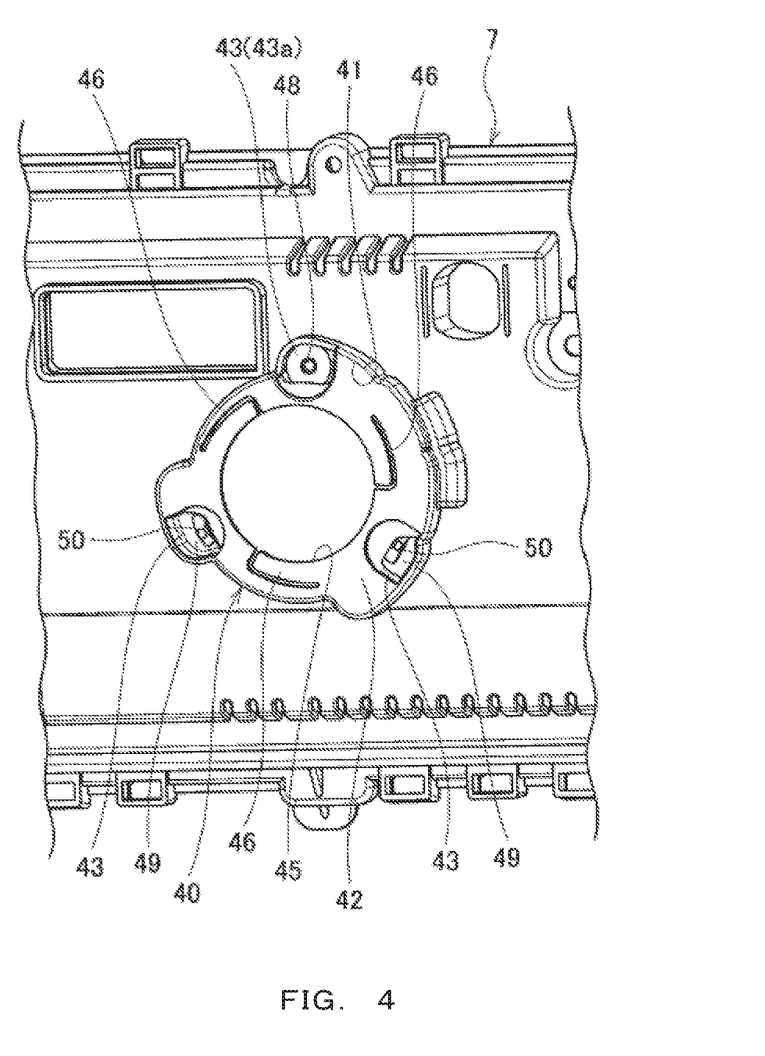
FIG. 4 is a perspective view obtained when the outer case is seen from the back surface where the recess is particularly illustrated.

FIG. 4 is a perspective view obtained when the outer case 7 is seen from the back surface where the recess 40 is particularly illustrated.

Figure 5:
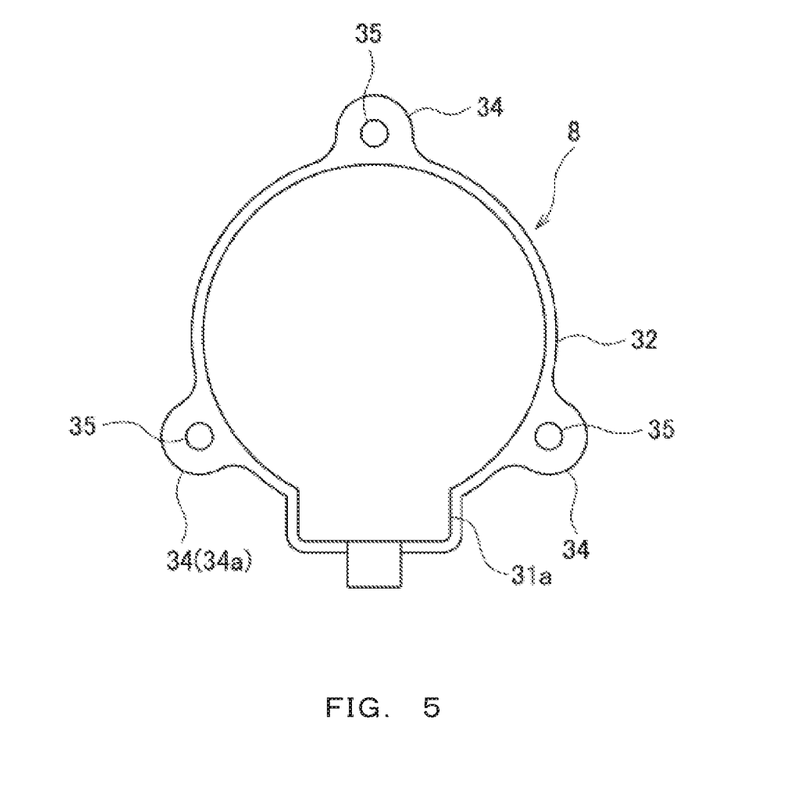
FIG. 5 is a front view of a speaker.

FIG. 5 is a front view of the speaker 8.

The speaker 8 includes a body 31 (FIG. 2) and a speaker case 32. The body 31 has a substantially regular cylindrical shape having a protruding area 31a partially protruding in an outer circumferential direction. The speaker case 32 covers the body 31. The speaker case 32 includes flanges 34. The flanges 34 bulge radially outward from an outer periphery of the speaker case 32 (body 31). The flanges 34 are provided at three places. However, the number of flanges 34 is not limited to three. The flanges 34 include holes 35. Protrusions 50 of fixing parts 43 described later fit into the holes 35. It is noted that the speaker case 32 includes a sound emission hole (not illustrated) for emitting sound effects and sound output from the body 31, on a back surface 32a side (FIG. 2) side during installation.

The recess 40 includes a side wall 41, an installation surface 42, and fixing parts 43. The side wall 41 is a wall extending in a depth direction of the recess 40. The installation surface 42 is a surface on which the speaker 8 is installed and is orthogonal to the side wall 41. The installation surface 42 includes an opening 45 and plate springs 46 being elastic bodies. The opening 45 is provided at a position corresponding to the sound emission hole of the speaker case 32 at approximately the center of the installation surface 42. The opening 45 emits the sound emitted from the sound emission hole from the back side of the outer case 7. The plate springs 46 push the speaker 8 in a direction in which the flanges 34 and the fixing parts 43 are brought into contact with each other. The plate springs 46 are present at three locations when the installation surface 42 is raised. The number of plate springs 46 is not limited to three. The plate springs 46 may be elastic bodies being separate members of the installation surface 42.

The fixing parts 43 bulge inward from the side wall 41 and in parallel with the installation surface 42, and fix the flanges 34 in an orthogonal direction (Z direction in FIG. 2) orthogonal to the installation surface 42. The corresponding number of fixing parts 43 are provided at places corresponding to the positions of the flanges 34 (intervals between the flanges 34). In the present embodiment, the fixing parts 43 are provided at three places. One of the plurality of fixing parts 43 is a screwing fixing part 43a. The screwing fixing part 43a includes a screw hole 48 for screwing the flanges 34 and the fixing parts 43 from the back side of the outer case 7. Thus, unlike the other fixing parts 43, the screwing fixing part 43a has a tubular shape and bulges inward from the side wall 41 more greatly than the other fixing parts 43. That is, the screwing fixing part 43a, which includes the screw hole 48, has an occupied area larger than those of the other fixing parts 43. The other fixing parts 43 include protrusions 50 on surfaces 49 facing the flanges 34. The protrusions 50 fit into the holes 35 of the flanges 34.

Next, mounting of the speaker 8 to the recess 40 will be described.

Figure 6A:
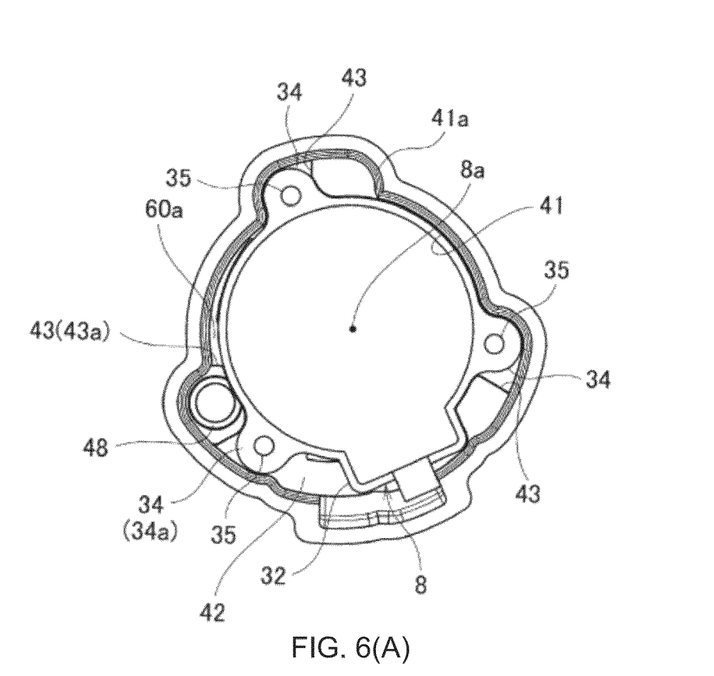
FIG. 6(A) is an explanatory diagram in a case where the speaker is in an unfixing position.
Figure 6B:
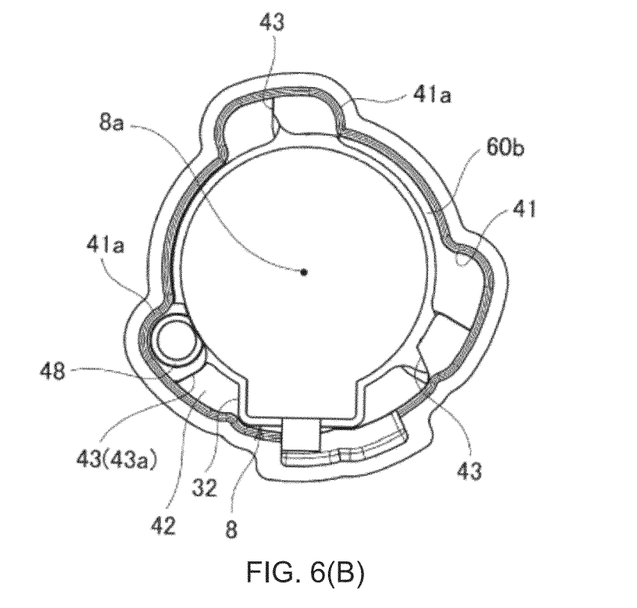
FIG. 6(B) is an explanatory diagram in a case where the speaker is in a fixing position.

FIG. 6(A) is an explanatory diagram in a case where the speaker 8 is in an unfixing position, and FIG. 6(B) is an explanatory diagram in a case where the speaker 8 is in a fixing position.

First, the speaker 8 is arranged in the recess 40. At this time, as illustrated in FIG. 6(A), the speaker 8 is arranged in the unfixing position where the flanges 34 and the fixing parts 43 do not overlap in the Z direction. Outer shapes of the speaker case 32, the fixing parts 43, and the recess 40 are shapes that do not contact each other if being arranged in the unfixing position. In particular, the screwing fixing part 43a has a larger bulging amount than the other fixing parts 43, and normally, the screwing fixing part 43a is contacted by the speaker 8. However, in a case where the speaker 8 is arranged in the unfixing position, a central axis 8a of the speaker 8 having a columnar shape is arranged farther from the screwing fixing part 43a than that in a case where the speaker 8 is arranged in the fixing position. Thus, as illustrated in FIG. 6(A), a gap 60a is formed between the side wall 41 in the vicinity of the screwing fixing part 43a and the speaker 8.

Next, as illustrated in FIG. 6(B), the speaker 8 is rotated to the fixing position where the flanges 34 and the fixing parts 43 overlap in the Z direction. The speaker 8 rotates by a predetermined amount clockwise about the rotational axis in the Z direction. The rotational axis is eccentric with respect to the central axis 8a of the speaker 8. Thus, when the speaker 8 rotates, the speaker 8 (central axis 8a) approaches (moves) toward the screwing fixing part 43a. As a result, the gap 60a formed when the speaker 8 is arranged in the unfixing position is eliminated. On the other hand, as illustrated in FIG. 6(B), between the side wall 41 and the speaker 8, a gap 60b is formed by an amount of movement of the speaker 8. When the speaker 8 rotates by a predetermined amount, the flanges 34 hit rotation stoppers 41a of the side wall 41, and the speaker 8 is restricted from rotating clockwise. Further, the holes 35 of the flanges 34 are fitted with the protrusions 50 of the fixing parts 43, and thus, the rotation of the speaker 8 is restricted. The fitting between the holes 35 and the protrusions 50 can inform an operator that the rotation reaches the fixing position through a sense and a sound generated during the fitting. The flanges 34 overlap with the fixing parts 43 in the Z direction, and thus, the speaker 8 is restricted from moving in the Z direction, that is, in a direction in which the speaker 8 is removed from the recess 40. Thereafter, the screwing fixing part 43a and the corresponding flange 34a are screwed.

Accordingly, the speaker 8 is sandwiched between the fixing parts 43 and the plate springs 46 to be fixed to the recess 40. At this time, the plate springs 46 push the speaker 8 in the Z direction to bring the flanges 34 into contact with the fixing parts 43. As a result, the flanges 34 certainly contact the fixing parts 43 to prevent generation of a contact sound generated between the flanges 34 and the fixing parts 43 along with the vibration.

The instrument 1 in the present embodiment can improve the workability at the time of mounting the speaker 8. That is, as a result of the instrument 1 including the fixing parts 43 and the flanges 34, it is possible to fix the speaker 8 to the outer case 7 by the speaker 8 being rotated after the speaker 8 is arranged in the recess 40. Therefore, the instrument 1 can easily fix the speaker 8 with a small number of components.

Moreover, the speaker 8 can be more reliably fixed to the outer case 7 by screwing the pair of screwing fixing part 43a and the flange 34a.

Further, as a result of the instrument 1 including the plate springs 46, the protrusions 50, and the holes 35, the speaker 8 can be more reliably fixed to the outer case 7. Thus, the speaker 8 does not rattle in the recess 40, and the reliability in fixation of the speaker 8 can be improved.

Although some embodiments of the present invention have been described, these embodiments are presented by way of example and are not intended to limit the scope of the invention. These novel embodiments can be implemented in various other forms, and various omissions, replacements, and changes can be made without departing from the scope of the invention. These embodiments and modifications thereof are included in the scope and gist of the invention, and are included in the invention described in the claims and the equivalents thereof.

For example, although the screwing fixing part 43a and the flange 34a are screwed, the screwing may be omitted. Moreover, the holes 35 of the speaker case 32 and the protrusions 50 of the fixing parts 43 may not be omitted where appropriate. Further, the plate springs 46 may not be also omitted where appropriate.

DESCRIPTION OF REFERENCE NUMERALS

1 Vehicular instrument (instrument)
2 Pointer-type instrument
4 Liquid crystal display
5 Circuit board
6 Middle case
7 Outer case
7a Back surface
8 Speaker
8a Central axis
9 Facing plate
9a, 9b Opening window
10 Transparent panel
11 Pointer
12 Dial
16 Index
31 Body
31a Protruding area
32 Speaker case
32a Back surface
34, 34a Flange
35 Hole
40 Recess
41 Side wall
41a Rotation stopper
42 Installation surface
43 Fixing part
43A Screwing fixing part
45 Opening
46 Plate spring
48 Screw hole
49 Surface
50 Protrusion
60a, 60b Gap

The invention claimed is:

1. An instrument, comprising:
a body;
a speaker that has a plurality of flanges bulging outward from the body; and
a case that has a recess for housing the speaker, wherein the recess includes a side wall, an installation surface on which the speaker is installed, and a plurality of fixing parts that bulge inward from the side wall and that fix the flanges in an orthogonal direction orthogonal to the installation surface, and
the speaker is rotatable about a rotational axis in the orthogonal direction up to a fixing position where the flanges and the fixing parts overlap each other in the orthogonal direction after the speaker is disposed in an infixing position where the flanges and the fixing parts do not overlap each other in the orthogonal direction.

2. The instrument according to claim 1, wherein one of the plurality of fixing parts is a screwing fixing part including a screw hole for screwing the flange and the fixing part.

3. The instrument according to claim 2, wherein the screwing fixing part bulges much inwardly from the side wall than the other fixing parts, and
the rotational axis is eccentric with respect to a center of the speaker so that the speaker approaches toward a side of the screwing fixing part when the speaker rotates.

4. The instrument according to claim 1, wherein the installation surface includes an elastic body that pushes the speaker in a direction in which the speaker is brought into contact with the flanges and the fixing parts.

5. The instrument according to claim 1, wherein the fixing parts include protrusions on surfaces facing the flanges, and
the flanges include holes that fit with the protrusions when the speaker is in the fixing position.

* * * * *